UNITED STATES PATENT OFFICE.

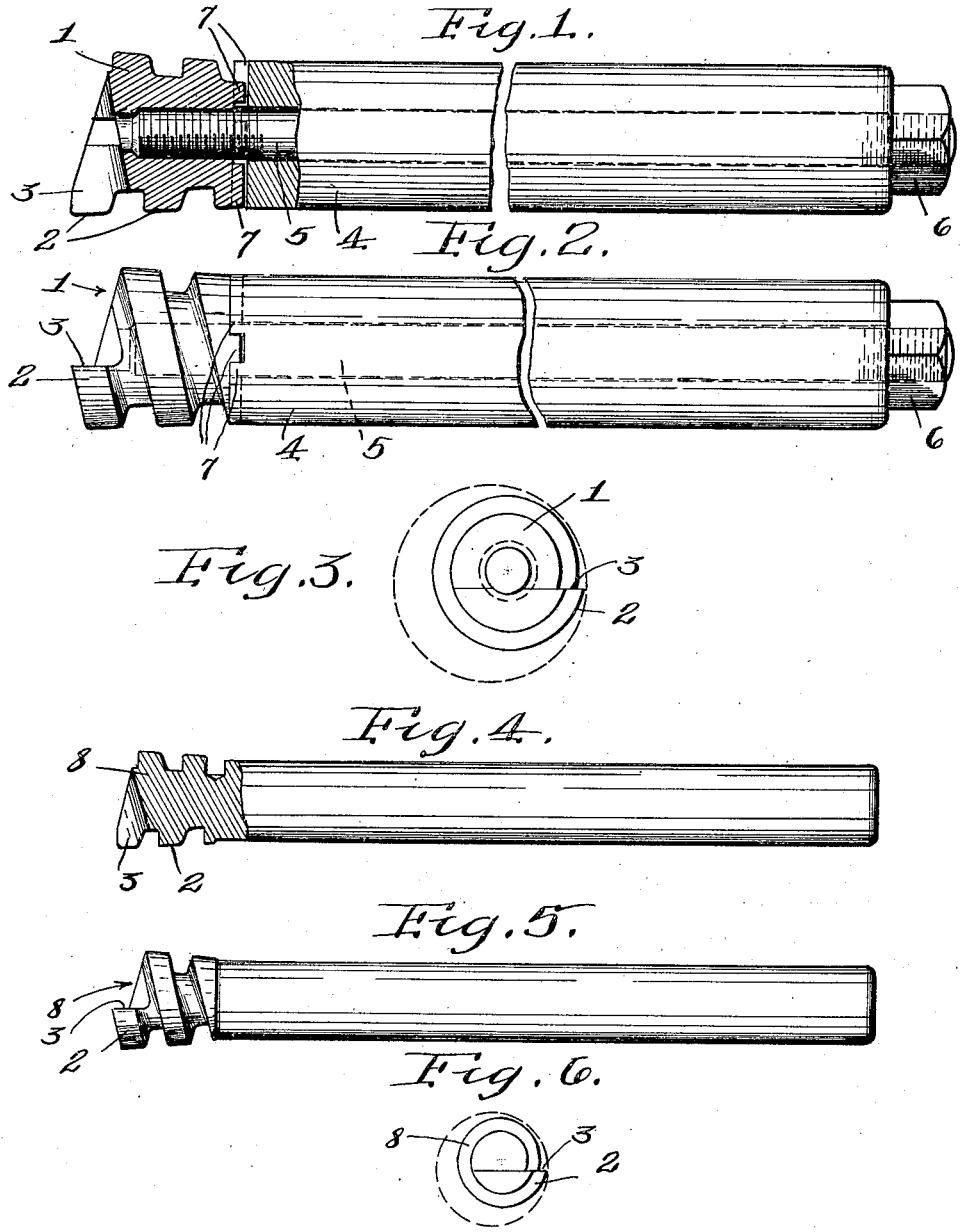

GEORGE G. PORTER, OF SYRACUSE, NEW YORK.

BORING AND CUTTING TOOL.

1,360,016.  Specification of Letters Patent.  Patented Nov. 23, 1920.

Application filed June 17, 1919. Serial No. 304,866.

*To all whom it may concern:*

Be it known that I, GEORGE G. PORTER, a citizen of the United States, and a resident of Syracuse, in the county of Onondaga and State of New York, have invented a certain new and useful Boring and Cutting Tool, of which the following is a specification.

This invention relates to boring and cutting tools for use in lathes, boring mills, screw machines and other machine tools, and has for its object a boring tool with a suitably formed cutting lip having proper cutting and clearance angles, and which can be re-sharpened by simply grinding it on its top face, without changing the shape of the cutting lip.

Another object is to provide a tool with a much longer cutting lip or blade and consequently greater cutting life than those as at present constructed, and which, as compared with them, can be re-sharpened an almost infinite number of times before it becomes necessary to throw it away, or have it reforged and re-dressed or re-machined to put it into condition for use again, thereby effecting a considerable saving in time and a great deal of expensive material.

Other objects are to provide a tool with properly formed cutting and clearance angles and cutting lip which can be sharpened much quicker and easier than the ordinary forms of boring tools and by a person or operator not highly skilled in the art, thereby effecting further savings.

In describing this invention, reference is had to the accompanying drawings in which like characters designate corresponding parts in all the views.

Figure 1 is an elevation, shown partly in section of one form of boring tool in which the cutter head is made of expensive high speed or carbon tool steel, and is detachably secured to a shank of low grade steel.

Fig. 2 is an elevation of the tool looking upwardly in Fig. 1.

Fig. 3 is an end view thereof, a circle indicating the position of a hole being bored with reference to the cutting lip also shown.

Figs. 4, 5 and 6 are views similar to Figs. 1, 2 and 3, of another form of boring tool in which the cutter head is integral with or integrally united to the shank.

This tool comprises a cutter having a long helical cutting lip so formed around the axis of the tool that it can be repeatedly sharpened by merely grinding the top thereof so that the entire cutter which is composed of expensive tool steel can be almost entirely used and no useless stub of tool steel is left. Furthermore, the cutter can be sharpened quickly without the exercise of a high degree of skill thereby effecting a considerable saving in time.

This tool is formed with a peripheral blade or lip extending around the same and terminating in an end edge face facing in a direction toward the longitudinal plane of the cutter.

The outer faces, that is the peripheral and lateral side faces of the blade meeting the end edge face to form the cutting edges.

The cutter 1 is formed with a helical blade or lip 2 having a plurality of convolutions which gradually increase in diameter toward the outer end of the cutter and the outer and larger end convolution terminates in an end edge or top face 3 facing toward the longitudinal plane of the cutter, said face 3 being located below the center of the cutter out of a plane radial with the axis of the cutter thereby providing maximum clearance for the cutting edge as seen in Fig. 3.

If the face were on the center or radial, or above the center, the clearance would be small. By below center, is meant that the convolution is ground down beyond or past the center instead of providing said face on a portion containing or extending over the center. Owing to the convolutions gradually increasing in diameter, clearance is provided for the convolutions so that they will not touch the sides of the hole being bored, it being understood that the tool is located with its axis parallel to the axis of the hole.

4 is the shank of the tool made of a cheaper grade of steel, and as seen in Figs. 1 and 2 the cutter is detachably mounted on the shank. This permits of the same shank being used for different cutters which might be formed with different clearance angles and ground with different amounts of rake on the top to suit the required cutting conditions of the work to be done and the ideas of the operator. Also the same shank can be used repeatedly for other cutters as they become worn out.

As illustrated in Figs. 1 and 2, the cutter is formed with an axially threaded bore and the shank 4 is tubular, and the parts 1 and 4 are secured together by a fastening member as a screw 5 extending lengthwise of and within the tubular shank 4 and threading into the bore of the cutter 1. The head 6 of the screw bears against the outer end of the shank, also, the meeting faces of the cutter 1 and shank 4 are here shown as formed with interlocking teeth or jaws 7 which take all of the twisting strain and prevent the cutter from shifting on the shank, the bolt being depended on only for holding the cutter against the face of the shank.

In Figs. 4 and 5, the cutter 8 is shown as formed integral with or integrally united to the shank.

In Figs. 1 and 4, the blade is shown as formed with a conical periphery.

Owing to the receding of the peripheries of the convolutions of the blades, all that is necessary in sharpening the cutter is to grind off the top edge face 3, and owing to the convolutions a long lip can be provided the entire length of the helical portion of the cutter formed of tool steel so that the life of the cutter is comparatively long and further the part of the cutter composed of expensive tool steel can be almost entirely consumed.

What I claim is:

1. A cutting tool having a helical cutting lip terminating at the end of the tool in an end edge face facing toward the longitudinal plane of the tool and below the center out of a plane radial to the axis of the tool, substantially as and for the purpose described.

2. A cutting tool having a helical cutting lip, the convolutions of which gradually increase in diameter toward the free end of the tool, the end convolution terminating in an end edge face facing in a direction toward the longitudinal plane of the tool, substantially as and for the purpose specified.

3. A boring tool having a tubular shank, a cutter head arranged end to end with the shank, the shank and head having interlocking teeth on their abutting ends and a fastening member extending through the tubular shank and into the cutter head, substantially as and for the purpose specified.

4. A metal cutting tool comprising a shank, a cutter mounted on the end of the shank and having a helical cutting lip terminating at the end of the tool in an end edge face, said shank being tubular and the cutter having a threaded bore alined with a passage of the shank, and a screw extending lengthwise of the tubular shank and extending into the bore of the cutter, substantially as and for the purpose specified.

In testimony whereof, I have hereunto signed my name, at Syracuse, in the county of Onondaga, and State of New York, this 14th day of May, 1919.

GEORGE G. PORTER.